(12) United States Patent
Achleitner et al.

(10) Patent No.: US 11,814,997 B2
(45) Date of Patent: Nov. 14, 2023

(54) METHOD FOR OPERATING AN EXHAUST GAS CLEANING SYSTEM ARRANGED IN THE EXHAUST LINE OF AN INTERNAL COMBUSTION ENGINE, AND EXHAUST GAS CLEANING SYSTEM

(71) Applicant: Vitesco Technologies GmbH, Regensburg (DE)

(72) Inventors: Erwin Achleitner, Obertraubling (DE); Tino Arlt, Lappersdorf (DE); Florian Kleiner, Kehlheim (DE); Gerhard Haft, Maxhütte-Haidhof (DE)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 17/661,129

(22) Filed: Apr. 28, 2022

(65) Prior Publication Data

US 2022/0251989 A1    Aug. 11, 2022

Related U.S. Application Data

(63) Continuation of application No. PCT/EP2020/078318, filed on Aug. 10, 2020.

(30) Foreign Application Priority Data

Oct. 30, 2019   (DE) ..................... 10 2019 216 779.9

(51) Int. Cl.
*F01N 3/20* (2006.01)
*F01N 3/10* (2006.01)

(52) U.S. Cl.
CPC .......... *F01N 3/2013* (2013.01); *F01N 3/101* (2013.01); *F01N 3/2093* (2013.01); *F01N 2240/16* (2013.01); *F01N 2430/10* (2013.01)

(58) Field of Classification Search
CPC .. F01N 3/2013; F01N 3/2093; F01N 2240/16; F01N 2430/10
See application file for complete search history.

(56) References Cited

U.S. PATENT DOCUMENTS

| | | | |
|---|---|---|---|
| 2002/0092298 | A1 | 7/2002 | Bruck |
| 2013/0031889 | A1 | 2/2013 | Roos |

(Continued)

FOREIGN PATENT DOCUMENTS

| | | | |
|---|---|---|---|
| DE | 19943846 | A1 | 3/2001 |
| DE | 102012213187 | A1 | 2/2013 |

(Continued)

OTHER PUBLICATIONS

Machine translation of DE 102017213004 A1, accessed Dec. 2, 2022. (Year: 2022).*

(Continued)

*Primary Examiner* — Jonathan R Matthias

(57) ABSTRACT

A method for operating an exhaust-gas purification system which is arranged in the exhaust system of an internal combustion engine, and an exhaust-gas purification system, are described. In the method, a combination of electrical catalytic converter heating measures with internal combustion engine catalytic converter heating measures is implemented, whereby particularly fast and inexpensive heating of a catalytic converter is achieved. The corresponding exhaust system preferably has, in an exhaust-gas flow direction, firstly a support catalytic converter and then a heated catalytic converter.

10 Claims, 1 Drawing Sheet

(56) References Cited

U.S. PATENT DOCUMENTS

| | | | |
|---|---|---|---|
| 2015/0285161 A1* | 10/2015 | Ulrey | B60W 10/08 477/3 |
| 2017/0120756 A1* | 5/2017 | Yokoyama | F02B 63/042 |
| 2018/0016993 A1 | 1/2018 | Moore | |
| 2019/0242316 A1 | 8/2019 | Dudar | |

FOREIGN PATENT DOCUMENTS

| | | |
|---|---|---|
| DE | 102015015794 A1 | 8/2016 |
| DE | 102015221501 A1 | 5/2017 |
| DE | 102016014254 A1 | 6/2017 |
| DE | 102017213004 A1 | 1/2019 |
| DE | 102019102963 A1 | 8/2019 |

OTHER PUBLICATIONS

International Search Report and Written Opinion dated Nov. 18, 2020 from corresponding International Patent Application No. PCT/EP2020/078318.

German Office Action dated Aug. 19, 2020 for corresponding German Patent Application No. 10 2019 216 779.9.

* cited by examiner

METHOD FOR OPERATING AN EXHAUST GAS CLEANING SYSTEM ARRANGED IN THE EXHAUST LINE OF AN INTERNAL COMBUSTION ENGINE, AND EXHAUST GAS CLEANING SYSTEM

CROSS-REFERENCE TO RELATED APPLICATIONS

This application claims the benefit of PCT Application PCT/EP2020/078318, filed Oct. 8, 2020, which claims priority to German Application 10 2019 216 779.9, filed Oct. 30, 2019. The disclosures of the above applications are incorporated herein by reference.

TECHNICAL FIELD

The disclosure relates to a method for operating an exhaust-gas purification system which is arranged in the exhaust system of an internal combustion engine and which has a heated catalytic converter for preheating a catalytic converter to bring the latter to its light-off temperature before the starting of the internal combustion engine.

BACKGROUND

It is known that catalytic converters arranged in the exhaust system of internal combustion engines attain their full functionality only above a certain temperature, the so-called light-off temperature. Below this temperature, the desired conversion of pollutants in the exhaust gas therefore does not take place to the full extent. However, in order to achieve sufficient pollutant conversion even during a cold start of the internal combustion engine, it is known to use so-called heated catalytic converters, which are electrically heated and which preheat the associated catalytic converter before the actual starting of the internal combustion engine. Here, the heated catalytic converter is activated before the actual starting of the internal combustion engine, for example 15 seconds before the starting of the internal combustion engine, in order to bring the temperature of the catalytic converter above the light-off temperature, which may for example be 300° C.

In order to accelerate the heating of the catalytic converter during a cold start, it is known to operate the internal combustion engine as an air pump before the starting thereof, in order to achieve particularly good heat transfer from the heated catalytic converter to the catalytic converter. It is therefore known, in addition to the electric heating, for a larger electrically heated catalytic converter volume to be heated with the aid of the internal combustion engine operated as an air pump.

SUMMARY

The present disclosure provides a method which allows critically rapid heating of the exhaust-gas purification system before the starting of the internal combustion engine.

One aspect of the disclosure provides a method that includes the following steps: electrically heating the heated catalytic converter before the starting of the internal combustion engine; operating the internal combustion engine, before the starting thereof, as an air pump; and thereafter starting the internal combustion engine. The catalytic converter is brought above the light-off temperature of the catalytic converter before the starting of the internal combustion engine by virtue of the internal combustion engine being controlled, during its air pump operating mode, such that air is drawn back into the combustion chamber and/or air is discharged into the intake tract.

Implementations of the disclosure may include one or more of the following optional features. In some implementations, electrical catalytic converter heating measures are thus combined with internal combustion engine catalytic converter heating measures. This achieves fast and inexpensive heating of the catalytic converter, such that a reduction of the pollutants emitted, such as of $NO_x$, is thus achieved. During a cold start of the internal combustion engine, it is possible to shorten the required heating-up time of the catalytic converter.

In some examples, it is possible to bring the catalytic converter above the light-off temperature, for example 300° C., before the starting of the internal combustion engine, for example before the commencement of injection, and to achieve the highest possible temperature at the heated catalytic converter when, for example, the injection is activated. In addition to the electric heating of the heated catalytic converter, the corresponding temperature increase is achieved by way of additional measures during the control of the internal combustion engine in the air pump operating mode. The electric heating power can be limited in this way.

The internal combustion engine catalytic converter heating measures that are implemented relate to the drawing of air back into the combustion chamber and/or the discharge of air into the intake tract. These measures may be implemented by virtue of the internal combustion engine being controlled, during the air pump operating mode, such that there is increased valve overlap between the outlet valves and inlet valves.

Modern internal combustion engines are nowadays equipped with variable valve control timing for the intake and exhaust camshafts. A valve overlap can thus be set during the catalytic converter heating operation. This causes a recirculation of exhaust gas, and thus more rapid heating, during heating from cold. During engine operation, the valve overlap is limited for the purposes of smooth running of the internal combustion engine.

Approximately ambient pressure prevails upstream of the catalytic converter. The pressure in the intake pipe is adjusted by way of the throttle flap of the internal combustion engine. During the valve overlap, the intake system and the exhaust system are connected to one another. When the internal combustion engine is operated as an air pump, the exhaust camshaft and the intake camshaft can be brought into a position of maximum adjustment. Furthermore, the throttle flap may be adjusted (throttled down) such that a certain absolute pressure is set in the intake pipe. Due to the negative pressure in the intake pipe, the air is drawn back into the intake pipe via the combustion chamber. A lower intake pipe pressure increases the throttling losses and thus the drive power, but also increases the quantity of air that is drawn back into the combustion chamber (the intake pipe).

The quantity of air drawn back in is dependent on the volume of the intake system (from the throttle flap to the inlet valves), the negative pressure in the intake pipe, the area of the valve overlap and the throttling losses at the inlet and outlet valves and, if applicable, an exhaust-gas turbine. The greater the negative pressure in the intake pipe, the higher the flow rate of the air that is drawn back in. This results in good heat transfer at the heated catalytic converter.

Appropriate control of the camshafts and of the throttle flap thus allows a proportion of the air to be conducted past the heated catalytic converter three times. This thus results in an overall increase in temperature for the same heating power, which may for example be 30%.

To achieve the above objectives, it is thus furthermore possible for the throttle flap of the internal combustion engine to be closed further during the air pump operating mode and/or for the intake pipe pressure to be reduced during the air pump operating mode.

In some examples, the method includes reducing the rotational speed of the internal combustion engine during the air pump operating mode.

The good heat transfer achieved at the heated catalytic converter as the air is drawn back in also allows the use of a very high electrical power at the heated catalytic converter without the risk of local overheating.

In some implementations, the following internal combustion engine catalytic converter heating measures may therefore be implemented individually or jointly in order to achieve fast heating: an initially relatively low rotational speed of the internal combustion engine, for example 600-800 rpm instead of 1,000 rpm during the first 15 seconds; a relatively low intake pipe pressure owing to the throttle flap being closed further; a greater valve overlap; drawing of the air back into the combustion chamber; discharging of air into the intake tract; and adjusting the throttle flap to reduce the intake pipe pressure in order to increase the air quantity that is drawn back in.

In some implementations, an exhaust-gas purification system executed the method. The exhaust-gas purification system includes, in an exhaust-gas flow direction, firstly a support catalytic converter and then a heated catalytic converter. Here, the heated catalytic converter preheats a three-way catalytic converter.

The use of such support catalytic converters in combination with heated catalytic converters (heated disks) is known. These are corresponding honeycomb bodies through which the exhaust gas flows. It is known here to arrange the heated catalytic converter such that the exhaust gas flows through it first, which exhaust gas subsequently passes through the support catalytic converter.

In some implementations, an arrangement is implemented in which the exhaust gas flows firstly into the support catalytic converter and then into the heated catalytic converter. This arrangement does have the disadvantage that the support catalytic converter constitutes a heat sink, whereby the light-off temperature is reached later and the conversion of the pollutants thus starts later. However, the reversed arrangement in relation to the prior art offers the advantage that the catalytic converter system can be heated at two points. Specifically, the internal combustion engine heats the support catalytic converter, while the heated catalytic converter heats the downstream catalytic converter (three-way catalytic converter).

In some examples, the improved heating is achieved both at the support catalytic converter and at the heated catalytic converter. For example, the combined measures (electric heating and internal combustion engine heating measures) bring both the support catalytic converter and the heated catalytic converter above the light-off temperature, of for example 300° C., before the starting of the internal combustion engine. A high temperature may be attained at the heated catalytic converter when the internal combustion engine is started (commencement of injection).

Another aspect of the disclosure provides an exhaust-gas purification system for carrying out the method described above. The exhaust-gas purification system has, in an exhaust-gas flow direction, firstly a support catalytic converter and then a heated catalytic converter.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
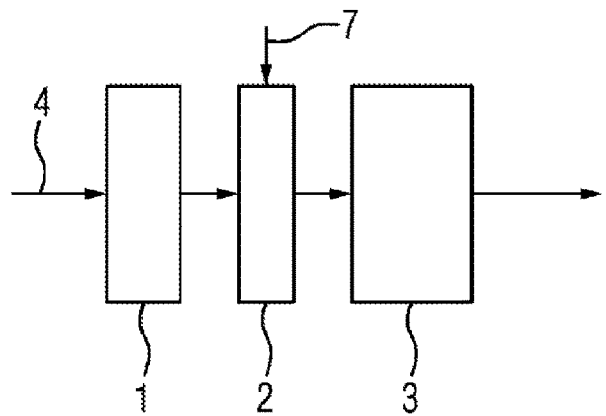
FIG. 1 is a highly schematic illustration of an exemplary exhaust-gas purification system.

In the present case, the aim is to achieve fast heating of a catalytic converter 3, which may, for example, be a three-way catalytic converter that is arranged in the exhaust system 4 of an internal combustion engine 6. A heated catalytic converter 2, which is configured as an electrically heated honeycomb body, serves for rapid heating of the catalytic converter 3. The system furthermore has a support catalytic converter 1, which is likewise configured as a honeycomb body.

By contrast to the prior art, in which, in a flow direction, the heated catalytic converter is arranged first and is followed by the support catalytic converter, it is the case in the solution described here that, in the exhaust-gas flow direction, the support catalytic converter 1 is arranged first and is followed by the heating catalytic converter 2, which has an electrical connection 7. The exhaust gas therefore flows firstly into support catalytic converter 1 and then into the heated catalytic converter 2. This arrangement offers the advantage that the catalytic converter system can be heated at two points. The internal combustion engine heats the support catalytic converter 1, and the heated catalytic converter 2 heats the downstream catalytic converter (three-way catalytic converter).

Figure 2:
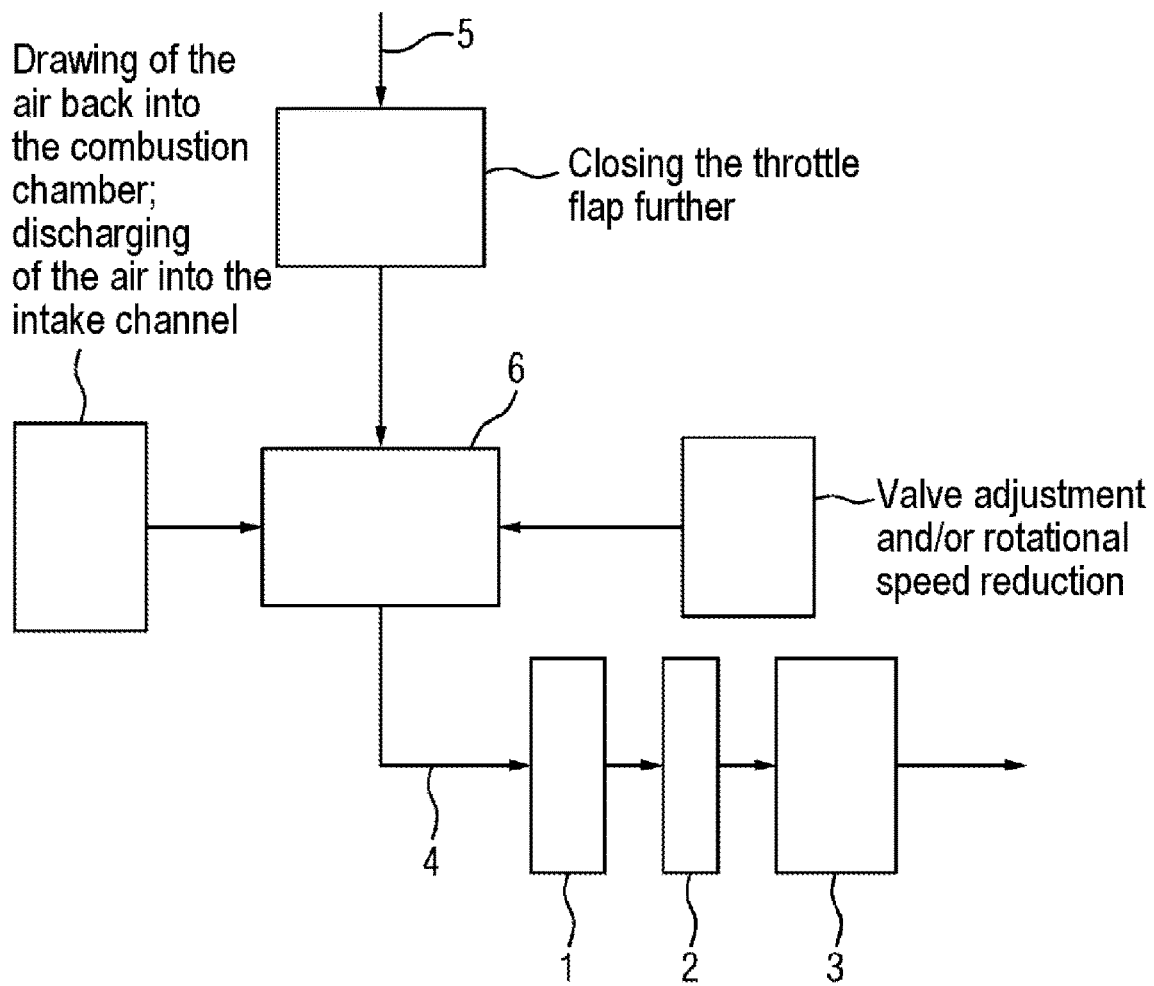
FIG. 2 is a highly schematic block diagram of an internal combustion engine with an exemplary exhaust-gas purification system.

In the present case, the aim is to bring the catalytic converter to its light-off temperature as quickly as possible, in order that, during the starting of the internal combustion engine as combustion motor, the catalytic converter can already perform the desired pollutant conversion. For this purpose, electrical catalytic converter heating measures (with the aid of the heated catalytic converter 2) are combined with internal combustion engine catalytic converter heating measures. The corresponding procedure is illustrated schematically in FIG. 2.

The procedure is such that the internal combustion engine is operated as an air pump until it is started. For this purpose, the internal combustion engine, with the injection deactivated, is cranked by an electric machine, for example by a belt-type starter generator, or is driven by an electric motor in a P1-P4 hybrid configuration. In addition to the electric heating of the heated catalytic converter 2, the internal combustion engine 6 is controlled, during the air pump operating mode thereof, such that air is drawn back into the combustion chamber and/or air is discharged into the intake tract. This may be implemented by various measures individually or jointly, for example by virtue of the throttle flap in the air intake channel 5 being closed further, by way of a corresponding valve adjustment of the outlet valves and inlet valves so as to result in an increased valve overlap, and/or by way of a reduction of the rotational speed of the internal combustion engine 6 during the air pump operating mode thereof. In any case, a temperature increase is achieved as a result, such that rapid and inexpensive heating of the catalytic converter is achieved overall.

In some examples, assuming a light-off temperature of the catalytic converter of 300° C., this light-off temperature will be reached before the starting of the internal combustion engine, for example within 15 seconds before the start, wherein the internal combustion engine is operated as an air pump during this period.

A number of implementations have been described. Nevertheless, it will be understood that various modifications may be made without departing from the spirit and scope of the disclosure. Accordingly, other implementations are within the scope of the following claims.

What is claimed is:

1. A method for operating an exhaust-gas purification system arranged in an exhaust system of an internal combustion engine, the method comprising:
   providing a support catalytic converter;
   providing a catalytic converter;
   providing a heated catalytic converter positioned between the support catalytic converter and the catalytic converter, the heated catalytic converter configured to preheat the catalytic converter causing the catalytic converter to reach its light-off temperature before a starting of the internal combustion engine;
   electrically heating the heated catalytic converter before the starting of the internal combustion engine;
   operating the internal combustion engine, before the starting thereof, as an air pump by:
      increasing circulation between an outlet valve and an inlet valve, and
      drawing air back into a combustion chamber and/or air is discharged into an intake tract,
      wherein the increase in circulation and the drawing air cause the catalytic converter to reach the light-off temperature; and
   thereafter starting the internal combustion engine,
   wherein during the air pump operating mode, the internal combustion engine is controlled such that there is an increased valve overlap between outlet valves and inlet valves.

2. The method of claim 1, further comprising:
   reducing an intake pipe pressure during the air pump operating mode and of the internal combustion engine.

3. The method of claim 1, further comprising:
   reducing a rotational speed of the internal combustion engine during the air pump operating mode.

4. The method of claim 1, further comprising:
   closing a throttle flap of the internal combustion engine further during the air pump operating mode.

5. The method of claim 1, wherein the heated catalytic converter preheats a three-way catalytic converter.

6. An exhaust-gas purification system arranged in an exhaust system of an internal combustion engine, the exhaust-gas purification system comprising, in an exhaust-gas flow direction:
   a support catalytic converter;
   a catalytic converter; and
   a heated catalytic converter positioned between the support catalytic converter and the catalytic converter, the heated catalytic converter configured to preheat the catalytic converter causing the catalytic converter to reach its light-off temperature before a starting of the internal combustion engine, the exhaust-gas purification system configured to execute a method comprising:
      electrically heating the heated catalytic converter before the starting of the internal combustion engine;
      operating the internal combustion engine, before the starting thereof, as an air pump;
      thereafter starting the internal combustion engine; and
      bringing the catalytic converter above the light-off temperature of the catalytic converter before the starting of the internal combustion engine by way of the internal combustion engine being controlled, during its air pump operating mode, such that air is drawn back into a combustion chamber and/or air is discharged into an intake tract,
   wherein the internal combustion engine is controlled, during the air pump operating mode, such that there is an increased valve overlap between outlet valves and inlet valves.

7. The exhaust-gas purification system of claim 6, wherein the method further comprises:
   reducing an intake pipe pressure during the air pump operating mode and of the internal combustion engine.

8. The exhaust-gas purification system of claim 6, wherein the method further comprises:
   reducing a rotational speed of the internal combustion engine during the air pump operating mode.

9. The exhaust-gas purification system of claim 6, wherein the method further comprises:
   closing a throttle flap of the internal combustion engine further during the air pump operating mode.

10. The exhaust-gas purification system of claim 6, wherein the heated catalytic converter preheats a three-way catalytic converter.

* * * * *